United States Patent
Suzuki et al.

(10) Patent No.: US 7,345,722 B2
(45) Date of Patent: Mar. 18, 2008

(54) LIQUID CRYSTAL DISPLAY DEVICE

(75) Inventors: Yutaka Suzuki, Tokyo (JP); Yoshifumi Doi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 11/019,318

(22) Filed: Dec. 23, 2004

(65) Prior Publication Data

US 2005/0105024 A1    May 19, 2005

Related U.S. Application Data

(62) Division of application No. 10/233,563, filed on Sep. 4, 2002, now Pat. No. 6,853,418.

(30) Foreign Application Priority Data

Feb. 28, 2002    (JP) ............................... 2002-53655

(51) Int. Cl.
G02F 1/1335    (2006.01)
(52) U.S. Cl. ...................... 349/114; 349/113
(58) Field of Classification Search ............ 349/61–68, 349/113–114, 139, 143
See application file for complete search history.

(56) References Cited

U.S. PATENT DOCUMENTS

| | | | |
|---|---|---|---|
| 5,796,509 A | 8/1998 | Doany et al. | |
| 6,466,292 B1 | 10/2002 | Kim | |
| 6,574,487 B1 | 6/2003 | Smith et al. | |
| 6,580,488 B2 * | 6/2003 | Kim | 349/143 |
| 6,674,496 B2 * | 1/2004 | Wei | 349/63 |
| 6,757,036 B1 * | 6/2004 | Dolezal et al. | 349/113 |
| 6,853,418 B2 * | 2/2005 | Suzuki et al. | 349/113 |
| 2001/0023194 A1 | 9/2001 | Pettersson et al. | |
| 2004/0080687 A1 * | 4/2004 | Chuang | 349/113 |

FOREIGN PATENT DOCUMENTS

| | | |
|---|---|---|
| JP | 2000-206523 | 7/2000 |
| JP | 2001-27756 | 1/2001 |
| JP | 2001-51251 | 2/2001 |
| JP | 2001-194661 | 7/2001 |
| JP | 2001-305525 | 10/2001 |
| JP | 2003-098545 | 4/2003 |

* cited by examiner

*Primary Examiner*—Dung T. Nguyen
(74) *Attorney, Agent, or Firm*—Leydig, Voit & Mayer, Ltd.

(57) ABSTRACT

A liquid crystal display device includes a single liquid crystal panel in which a liquid crystal material is sealed in a clearance between two transparent substrates, at least one light source, and at least one light-conducting plate. The liquid crystal panel includes a transmitting region and a reflecting region. A part of a first surface of the liquid crystal panel is a first display surface for the transmitting region and a part of a second surface of the liquid crystal panel is a second display surface for the reflecting region. A two-sided display is provided from a single liquid crystal panel and a thin and light-weight liquid crystal display device is achieved.

3 Claims, 8 Drawing Sheets

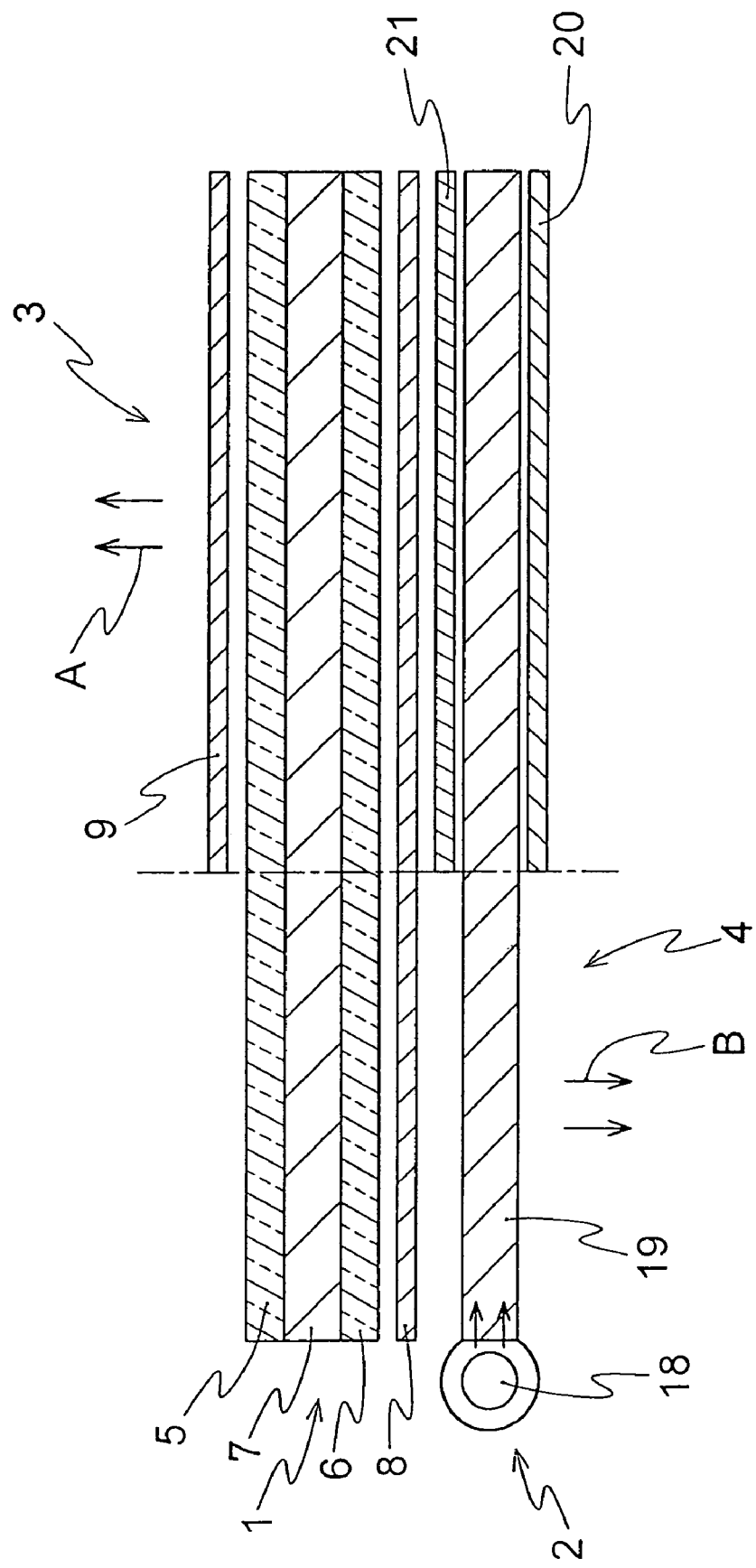

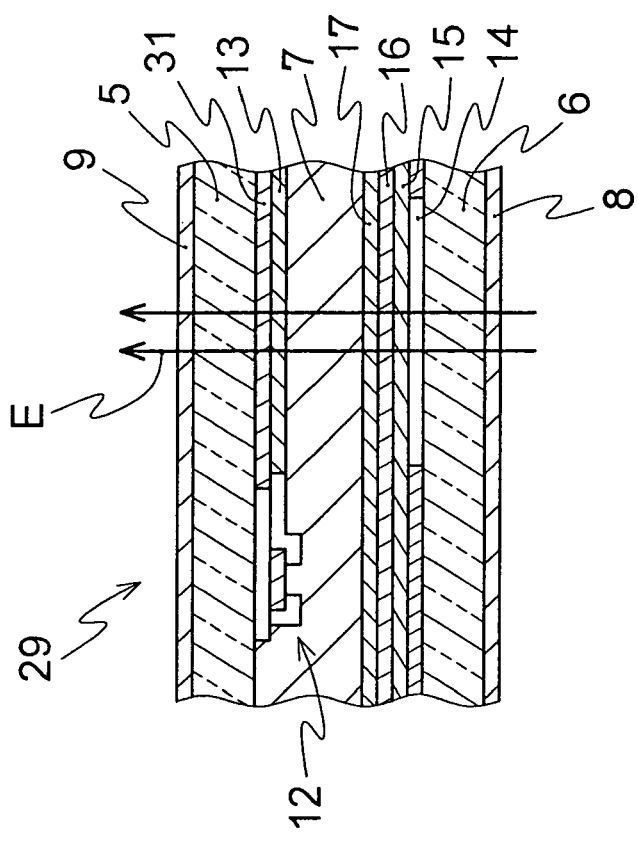
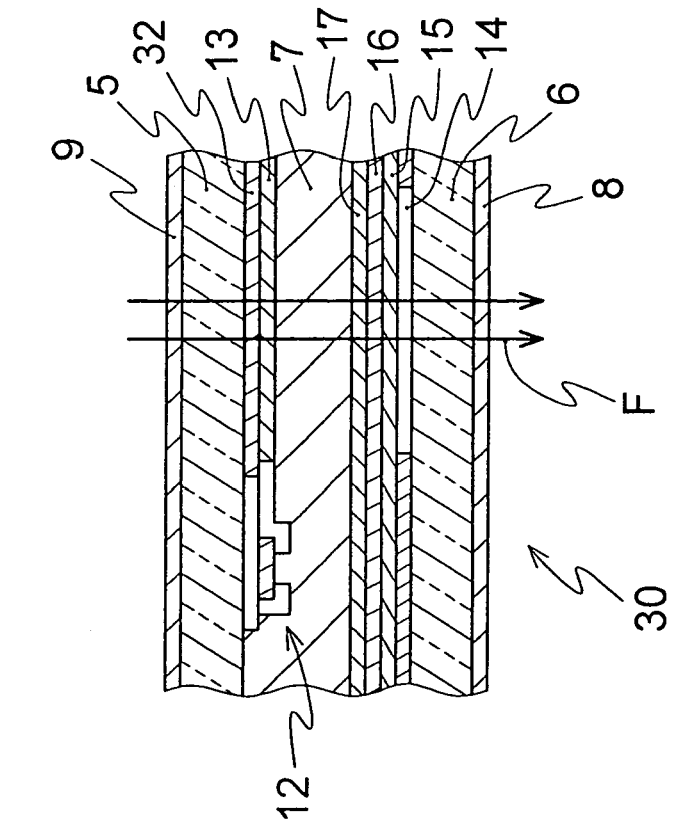

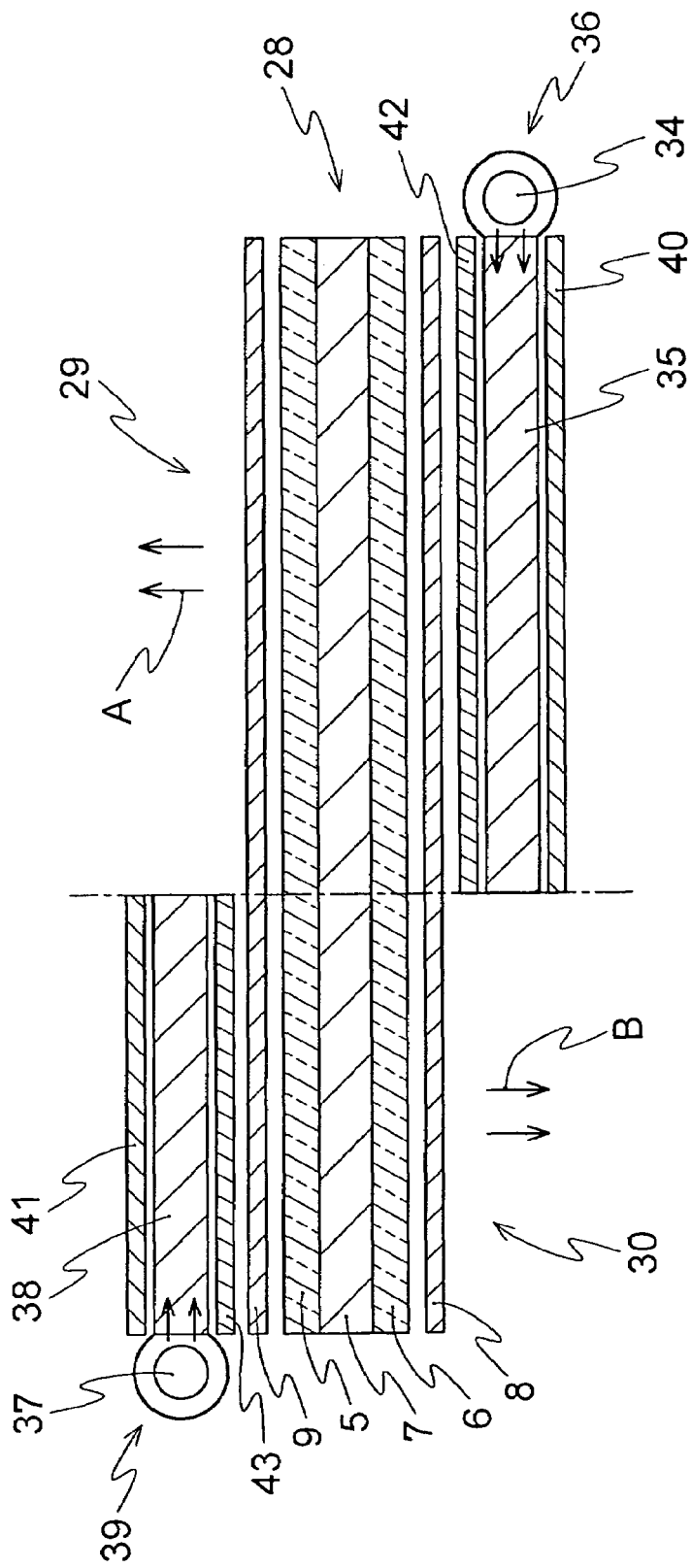

LIQUID CRYSTAL DISPLAY DEVICE

BACKGROUND OF THE INVENTION

The present invention relates to a liquid crystal display device. More particularly, the present invention relates to a liquid crystal display device which might be employed in mobile electronic equipments, which enables two-sided display, and which is moreover capable of achieving thin and light-weight devices.

Examples of conventionally suggested liquid crystal display devices capable of displaying images on both sides of a panel are those employing a method in which two separate liquid crystal panels are used, one on a front and on a rear or a method in which a pair of glass substrates is used wherein the substrates respectively serve as light-conducting plates.

However, both of the above methods were disadvantaged in that the thickness of the entire liquid crystal display devices became thick so that the subject of application thereof to mobile electronic equipments still remained. Particularly in the method in which glass substrates are employed as light-conducting plates, the two glass substrates needed to be of a thickness equivalent to light-conducting plates (approximately 1 mm) for allowing transmission of light into the interior of the glass substrates, and the thickness thereof was thus required to be approximately twice of the thickness of conventional glass substrates. This resulted not only in an increase of thickness of the liquid crystal panels but also in an increase of weight of a single glass substrate to as much as approximately 300 g (in case its thickness is approximately 1.1 mm) so as to lead to a drawback that the weight of the entire liquid crystal panels were increased. Another drawback was that the number of process steps was increased since liquid crystal panels, which were obtained by cutting glass substrates of large dimensions into desired dimensions, required processing of end surfaces through grinding or similar methods in order to make light incident from the end surfaces of the cut glass substrates.

SUMMARY OF THE INVENTION

The present invention has been made for solving the above problems, and it is an object thereof to provide a liquid crystal display device in which both-sided display is enabled by using a single liquid crystal panel in a liquid crystal display device of a type using light-conducting plates, and which is capable of achieving thinning and cuts in costs.

In accordance with a first aspect of the present invention, there is provided a liquid crystal display device including a single liquid crystal panel in which liquid crystal is sealed in a clearance formed between two transparent substrates, at least one light source, and at least one light-conducting plate, wherein the liquid crystal panel includes a transmitting type region and a reflecting type region, a part of one surface of the liquid crystal panel is defined to be a first display surface for the transmitting type region, and a part of the other surface of the liquid crystal panel is defined to be a second display surface for the reflecting type region.

In accordance with a second aspect of the present invention, there is also provided a liquid crystal display device including a single liquid crystal panel in which liquid crystal is sealed in a clearance formed between two transparent substrates, at least one light source, and at least one light-conducting plate, wherein the liquid crystal panel is composed of a single transmitting type liquid crystal panel, a part of one surface of the liquid crystal panel is defined to be a first display surface for display by using transmitted light from the other surface of the liquid crystal panel, and a part of the other surface of the liquid crystal panel is defined to be a second display surface for display by using transmitted light from the one surface of the liquid crystal panel.

According to the present invention, both-sided display is enabled by using a single liquid crystal panel and a thin and light-weighted structure of the liquid crystal display device is achieved thereby. With this arrangement, the liquid crystal display device of the present invention might be favorably employed in both-sided displaying devices of mobile electronic equipments such as mobile telephones.

BRIEF DESCRIPTION OF THE DRAWINGS

FIG. 1 is a sectional explanatory view showing one embodiment of a liquid crystal display device according to the present invention;

FIGS. 5(a) and 5(b) are sectional explanatory views showing a displaying condition of the liquid crystal display device of FIG. 4;

FIG. 6 is a sectional explanatory view showing yet another embodiment of a liquid crystal display device according to the present invention;

DETAILED DESCRIPTION

The liquid crystal display device of the present invention will now be explained in further details with reference to the drawings.

The liquid crystal display device of the present invention is so arranged that both-sided display of the liquid crystal panel is enabled upon forming a transmitting type and a reflecting type display region or two transmitting type display regions by using a single liquid crystal panel.

Figure 7:
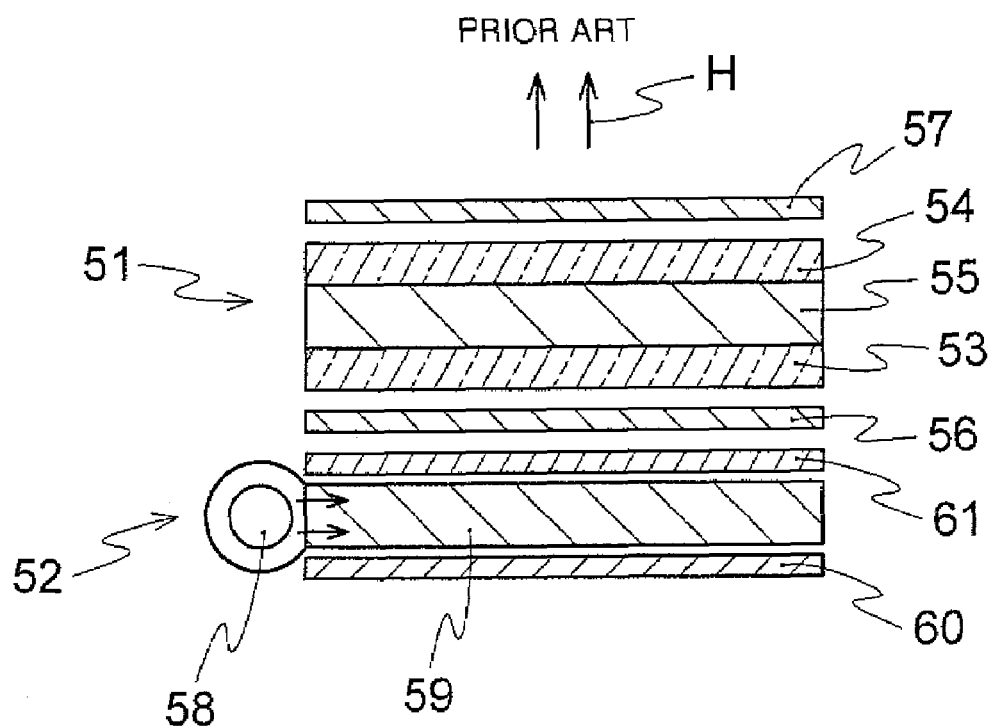
FIG. 7 is a sectional explanatory view of a conventional transmitting type liquid crystal display device.

Here, a conventional transmitting type liquid crystal display device will first be briefly explained. As shown in FIG. 7, the transmitting type liquid crystal display device includes a liquid crystal panel 51 and a back light 52. The liquid crystal panel 51 is so arranged that a liquid crystal layer 55 is sealed between an array substrate 53 made, for instance, of glass, and a color filter substrate 54, wherein polarizers 56, 57 are respectively provided outside of these substrates 53, 54. The back light 52 is composed of a light source 58, a light-conducting plate 59 for guiding light which has been emitted from the light source 58 to the entire surface of the liquid crystal panel 51, a reflecting plate 60 for preventing light passing through the light-conducting plate 59 from leaking out in a rear direction, and a diffusion plate 61 for making distribution of light which has been emitted from the light-conducting plate 59 uniform.

Figure 8:
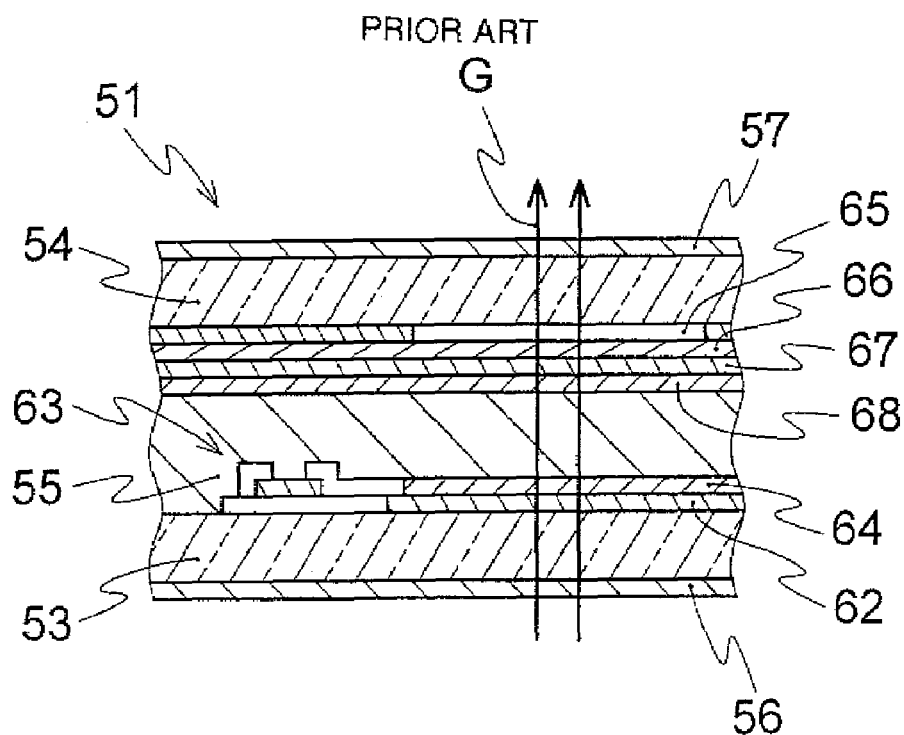
FIG. 8 is a sectional explanatory view showing a displaying condition of the transmitting type liquid crystal display device of FIG. 7.

As shown in FIG. 8 in more details, the liquid crystal panel 51 is so arranged that a pixel electrode 62 and a TFT 63 are formed inside of the array substrate 53 onto which an alignment layer 64 is further laminated whereas a color filter 65, a protective film 66, a common electrode 67 and an alignment layer 68 are laminated in this order inside of the color filter substrate 54.

With this arrangement, light which has been emitted from the light source 58 transmits through the liquid crystal panel 51 in the direction of arrow G upon passing through the light-conducting plate 59 as shown in FIGS. 7 and 8, whereupon an image is displayed in the direction of arrow H in FIG. 7.

Figure 9:
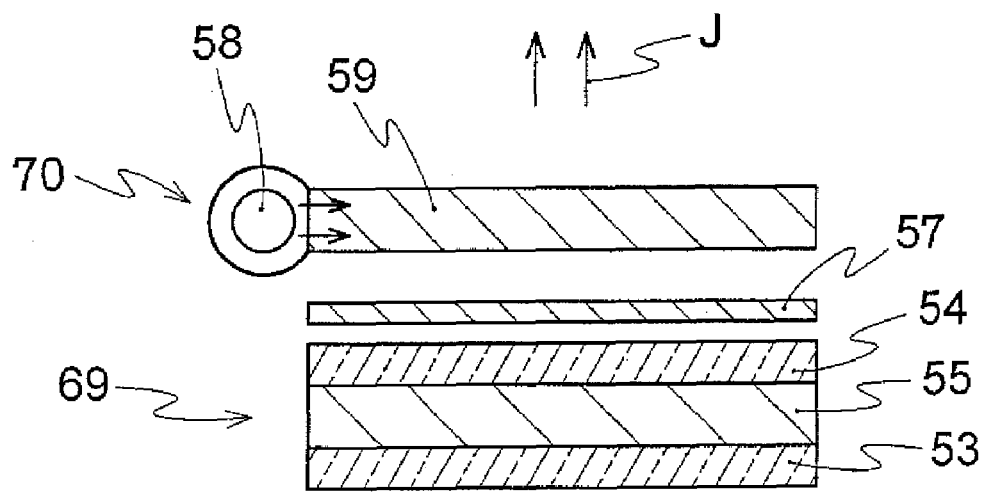
FIG. 9 is a sectional explanatory view of a conventional reflecting type liquid crystal display device.
Figure 10:
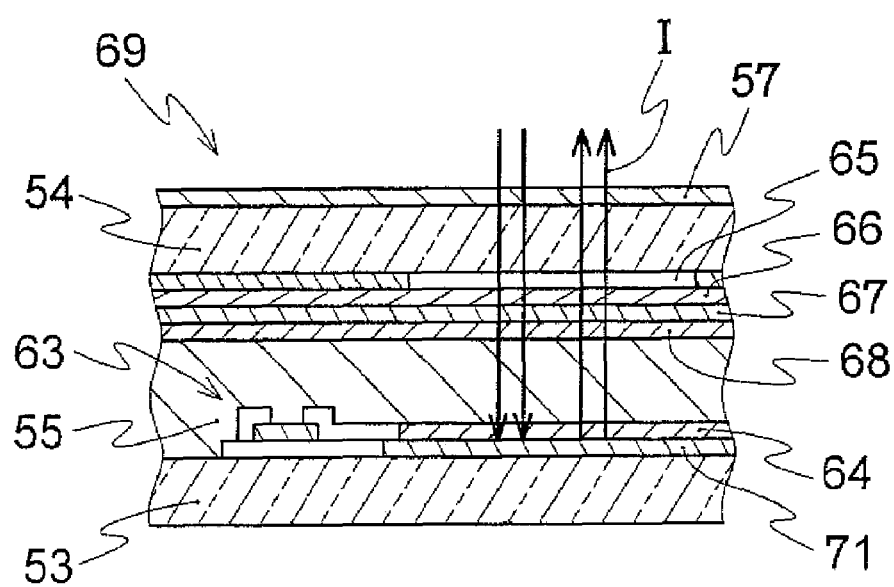
FIG. 10 is a sectional explanatory view showing displaying condition of the reflecting type liquid crystal display device of FIG. 9.

A conventional reflecting type liquid crystal display device includes a liquid crystal panel 69 and a front light 70 disposed on a frontward side of the liquid crystal panel 69 as shown in FIGS. 9 and 10. The basic arrangements of the liquid crystal panel 69 are common with those of the above liquid crystal panel 51 shown in FIGS. 7 and 8 so that portions which are marked with identical reference numerals indicate identical portions, while the panel 69 differs from the liquid crystal panel 51 of FIGS. 7 and 8 in that its pixel electrode 71 on the array substrate 53 side is composed of a reflecting layer.

With this arrangement, light which has been emitted form the light source 58 will once enter the interior of the liquid crystal panel 69 along the direction as illustrated by arrow I and will then be reflected at the pixel electrode 71 composed of a reflecting layer as shown in FIGS. 9 and 10. In this manner, an image will be displayed in the direction of arrow J in FIG. 9.

A thin and light-weighted structure has been achieved in the present invention by manufacturing a combination of a transmitting type region in which images are displayed by utilizing transmitting light as in the above transmitting type liquid crystal display device shown FIGS. 7 and 8 and a reflecting type region in which images are displayed by utilizing reflecting light of a pixel electrode in the interior of the liquid crystal panel as in the above reflecting type liquid crystal display device shown in FIGS. 9 and 10, and alternatively a combination of two transmitting type regions, within a single liquid crystal panel. Various forms for embodying the present invention will now be explained.

EMBODIMENT 1

FIG. 1 shows one embodiment of a liquid crystal display device according to the present invention which enables both-sided display. The liquid crystal display device of the present embodiment is composed of a liquid crystal display panel 1 including a transmitting type region 3 and a reflecting type region 4 as well as a common light unit 2.

The liquid crystal panel 1 is so arranged that a liquid crystal layer 7 having a thickness of several μm is sealed between an array substrate 5 made, for instance, of glass, and a color filter substrate 6, wherein polarizers 8, 9 are respectively disposed outside of both substrates 5, 6.

The glass substrates employed as the substrates 5, 6 might be glass substrates for use in mobile equipments which are generally used in these days with a thickness of approximately 0.6 mm. The polarizer 8 might, for instance, be of PVA (polyvinyl alcohol) or iodine group, or alternatively of dichroic organic dye group, and be of a thickness in a range of approximately 0.12 to 0.4 mm.

Figure 2A:
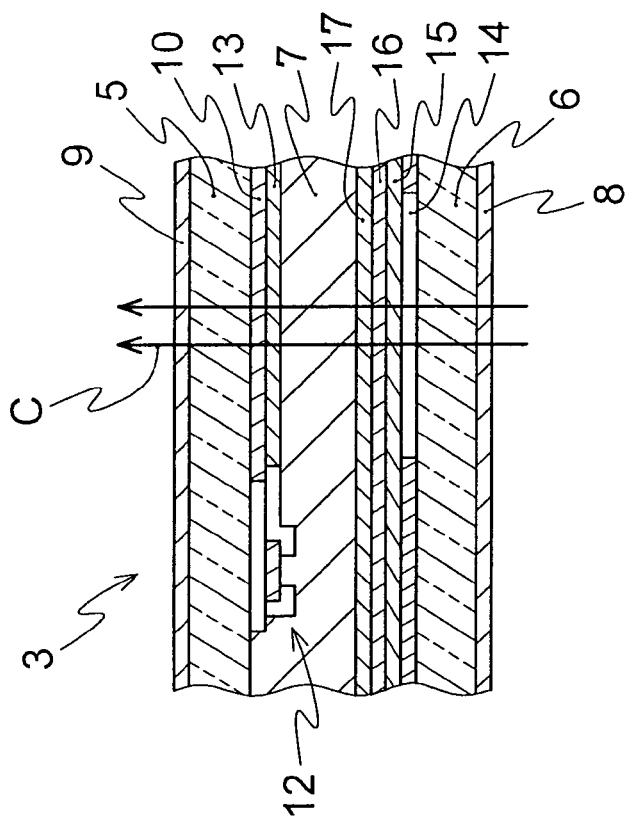
FIGS. 2(a) and 2(b) are sectional explanatory views showing a displaying condition of the liquid crystal display device of FIG. 1.
Figure 2B:
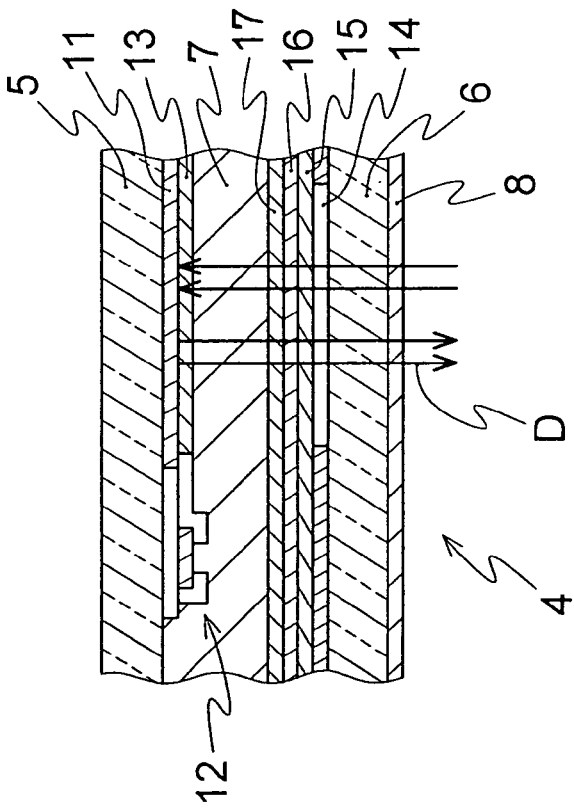

As shown in FIGS. 2(a) and 2(b), the liquid crystal panel 1 is so arranged that pixel electrodes 10, 11 and a TFT 12 are formed inside of the array substrate 5, and an alignment layer 13 is further laminated thereon. Here, the pixel electrode 10 of the transmitting type region 3 is a transparent pixel electrode comprising an ITO or the like through which light can transmit, while the pixel electrode 11 of the reflecting type region 4 is a pixel electrode which functions as a reflecting film made, for instance, of an aluminum alloy.

A color filter 14, a protective film 15, a common electrode 16 and an alignment layer 17 are laminated onto the inner surface of the color filter substrate 6 in this order.

As for the color filter 14, a coloring layer might be applied onto the glass substrate to be of a thickness of approximately 1 to 2 μm. The coloring material might, for instance, be a dye or a pigment. A transparent conductive film made, for instance, of ITO having a thickness of approximately 1,000 to 1,500 angstrom is employed as the common electrode 16. As for the alignment layer 17, a polyimide group orientation film as generally used in these days might be employed.

The common light unit 2 is composed, as shown in FIG. 2, of a light source 18, a light-conducting plate 19 for guiding light which has been emitted from the light source 18 to the entire surface of the liquid crystal panel 1, a reflecting plate 20 for preventing light passing through the light-conducting plate 19 formed in the transmitting type region 3 from leaking out in a rear direction, and a diffusion plate 21 for making distribution of light which has been emitted from the light-conducting plate 19 formed on the transmitting type region 3 uniform.

The light-conducting plate 19 might, for instance, be formed of transparent acrylic resin, and since a thickness more than a diameter of the light source (a lamp or a white-colored LED) is required in view of efficiency of incidence, one having a thickness of approximately 1 mm is employed. As for the reflecting plate 20, there might be employed aluminum foil or a plate on which aluminum is vapor deposited.

In FIG. 1, directions for viewing the respective regions are a direction A for viewing the transmitting type region 3 and a direction B for viewing the reflecting type region 4.

Display methods of the respective regions will now be explained with reference to FIGS. 2(a) and 2(b). For display of the transmitting type region 3, an image will be displayed by utilizing light which has been emitted from the light source 18 and passed through the light-conducting plate 19 as a back light as shown in FIG. 2(b), and by making the light transmit through the transmitting type region 3 along the direction of arrow C in FIG. 2(b). On the other hand, for display of the reflecting type region 4, an image will be displayed by utilizing light which has been emitted from the light source 18 and passed through the light-conducting plate 19 as a front light as shown in FIG. 2(a), and by making the light transmit through the reflecting type region 4 along the direction of arrow D. With this arrangement, both-sided display is enabled through a simple structure composed of a single liquid crystal panel 1, and a group composed of a light source 18 and an light-conducting plate 19, and it is possible to achieve a thin and light-weighted structure of the liquid crystal display device.

EMBODIMENT 2

Figure 3:
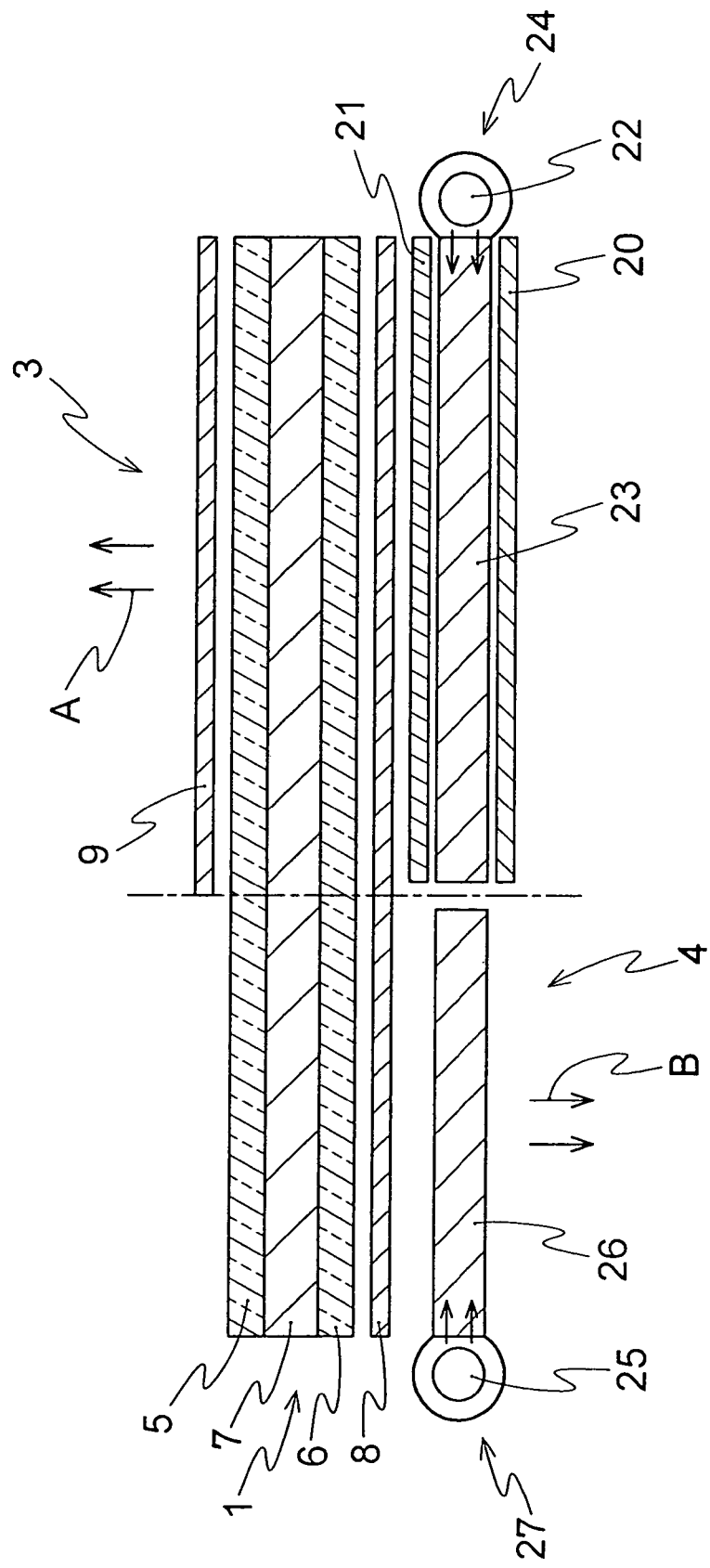
FIG. 3 is a sectional explanatory view showing another embodiment of a liquid crystal display device according to the present invention.

In FIG. 3, the common light unit 2 including a group composed of a light source 18 and a light-conducting plate 19 shown in FIG. 1 is separated into a back light unit 24 comprising a first group composed of a light source 22 and a light-conducting plate 23 and a front light unit 27 comprising a second group composed of a light source 25 and a light-conducting plate 26, respectively, for the transmitting type region 3 and the reflecting type region 4, so as to be individually controllable. The remaining arrangements are common with those of the liquid crystal display device shown in FIGS. 1 and 2, and reference numerals of FIG. 3 which are identical to the reference numerals of FIGS. 1 and 2 indicate portions which are identical with those shown in FIGS. 1 and 2.

In FIG. 3, a reflecting plate 20 is disposed on a lower surface of the light-conducting plate 23 of the transmitting type region 3. The light sources 22 and 25 might be of weaker power when compared to the light source 18 of FIG. 1 since areas each of which irradiate will be smaller. In case display is to be performed by using the transmitting type region 3, only the light source 22 is illuminated whereas in case display is to be performed by using the reflecting type region 4, only the light source 25 is illuminated to thereby reduce the power consumption. Since the display method of the liquid crystal display device of FIG. 3 is identical to that of FIG. 2, explanations thereof will be omitted.

EMBODIMENT 3

Figure 4:
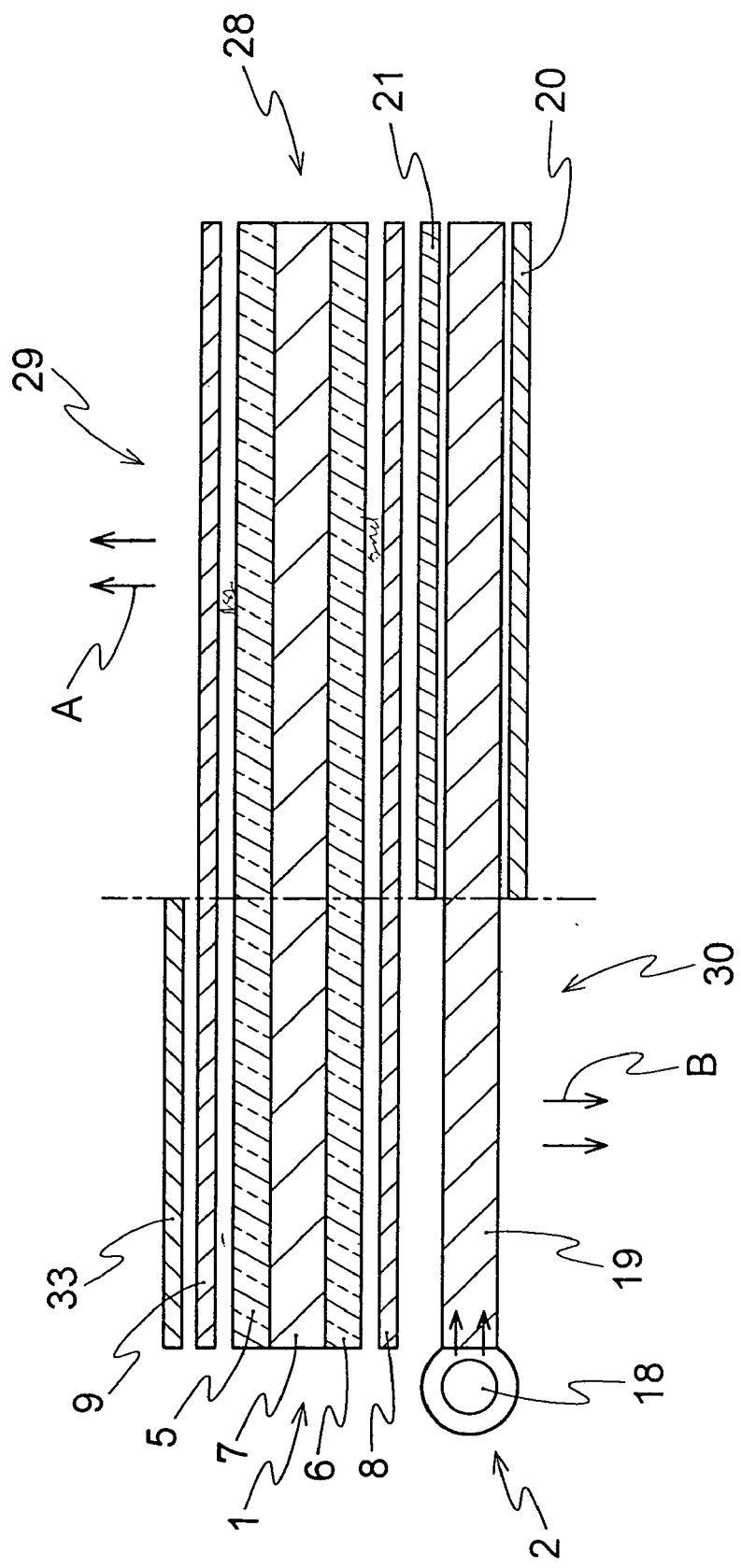
FIG. 4 is a sectional explanatory view showing still another embodiment of a liquid crystal display device according to the present invention.

FIG. 4 shows one embodiment of a display device using a liquid crystal panel 28 of which entire surface is of transmitting type instead of the liquid crystal panel 1 including the transmitting type region and the reflecting type region in the liquid crystal display device of FIG. 1. More particularly, as shown in FIG. 5, both of the pixel electrodes 31, 32 of the two transmitting type regions 29, 30 comprise transparent picture electrodes made of ITO or similar through which light might transmit. As shown in FIG. 4, the present embodiment is further provided with a reflecting plate 33 formed on an upper surface of the liquid crystal panel 28 of the region 30. The region 29 is arranged similar to that of FIG. 1. The remaining arrangements are common to those of the liquid crystal device shown in FIGS. 1 and 2, and reference numerals which are identical to the reference numerals of FIGS. 1 and 2 indicate portions which are identical to the portions shown in FIGS. 1 and 2.

The display methods of the respective regions will now be explained with reference to FIG. 5(a) and 5(b). Since the first transmitting region 29 is identical to that of FIG. 2(a), explanations thereof will be omitted. On the other hand, in case display is to be performed using the second transmitting type region 30, light which has been emitted from the light source 18 and passed through the light-conducting plate 19 will once transmit through the second transmitting type region 30 and upon being reflected by the reflecting plate 33, the light will again be transmitted through the second transmitting type region 30 whereby an image is displayed in the direction of arrow B in FIG. 4. With this arrangement, both-sided display by using a single liquid crystal panel, and one pair of a light source and a light-conducting plate will be enabled so as to achieve a thin and light-weighted structure of the liquid crystal display device.

EMBODIMENT 4

FIG. 6 shows a case in which, instead of the common light unit 2 composed of one pair of a light source 18 and a light-conducting plate 19 in the liquid crystal display device of FIG. 4, a first back light unit 36 composed of a light source 34 and a light-conducting plate 35 and a second back light unit 39 composed of a light source 37 and a light-conducting plate 38 are respectively used for the first transmitting type region 29 and the second transmitting type region 30 such that these can be individually controlled. By respectively disposing reflecting plates 40, 41 for the light-conducting plates 35, 38, light transmitting through the light-conducting plates 35, 38 are prevented from leaking out in rear directions. Similarly, the light-conducting plates 35, 38 are additionally provided with diffusion plates 42, 43, respectively, for uniform diffusion of light. The light sources 34 and 37 might be of weaker power when compared to the light source 18 of FIG. 4 since areas each of which irradiate will be smaller.

The liquid crystal display device shown in FIG. 6 is so arranged that an image is displayed by utilizing both of the first group composed of the light source 34 and light-conducting plate 35 and the second group composed of the light source 37 and the light-conducting plate 38, respectively as back lights for the first transmitting type region 29 and the second transmitting type region 30 and through light transmitting through the first transmitting type region 29 and the second transmitting type region 30. It should be noted that conditions of light transmitting through the first transmitting type region 29 and the second transmitting type region 30 are identical to those shown in FIG. 5.

The liquid crystal display device shown in FIG. 6 is so arranged that an image is displayed by utilizing both of the first group composed of the light source 34 and light-conducting plate 35 and the second group composed of the light source 37 and the light-conducting plate 38, respectively as back lights for the first transmitting type region 29 and the second transmitting type region 30 and through light transmitting through the first transmitting type region 29 and the second transmitting type region 30. It should be noted that conditions of light transmitting through the first transmitting type region 29 and the second transmitting type region 30 are identical to those shown in FIG. 5(a).

According to the present invention, both-sided display is enabled by using a single liquid crystal panel and a thin and light-weighted structure of the liquid crystal display device is achieved thereby. With this arrangement, the liquid crystal display device of the present invention might be favorably employed in both-sided displaying devices of mobile electronic equipments such as mobile telephones.

Further, according to the present invention, a common light unit composed of one group of a light source and a light-conducting plate can be employed as a light unit for display regions on both surfaces so that the structure can be simplified and the thickness of the entire liquid crystal display device can be reduced.

Moreover, according to the present invention, by providing individual light units for two display regions, areas of irradiation of the respective display regions will become smaller so that the light sources might be of weaker power. The power consumption might further be reduced since only a required display region is irradiated.

What is claimed is:

1. A liquid crystal display device having opposed first and second surfaces and providing a transmitted light display at a transmitted region on the first surface and a reflected light display at a reflected region of the second surface, the liquid crystal display device comprising:
- a single liquid crystal display panel in which a liquid crystal material is sealed in a clearance between two transparent substrates;
- a plurality of transistors disposed in the clearance between the two transparent substrates for switching electrical signals supplied to pixel electrodes of the liquid crystal panel;
- transparent pixel electrodes within the clearance and connected to transistors opposite the transmitted region;
- light reflecting pixel electrodes within the clearance and connected to transistors opposite the reflected region;
- at least one light source supplying light for enhancing at least one of the transmitted light display and the reflected light display; and
- at least one light-conducing plate for conducting light from the at least one light source.

2. The liquid crystal display device of claim 1 including a single light source and a single light-conducting plate disposed closer to the first surface of the liquid crystal display device than to the second surface of the liquid crystal display device and providing a back light for the transmitted light display and a front light for the reflected light display.

3. The liquid crystal display device of claim 1 including a first light source and a first light-conducting plate located opposite the transmitted region and providing a back light for the transmitted light display and a second light source and a second light-conducting plate located opposite the reflected region and providing a front light for the reflected light display.

* * * * *